US006955252B2

(12) United States Patent
Allport

(10) Patent No.: US 6,955,252 B2
(45) Date of Patent: Oct. 18, 2005

(54) DEVICE FOR ISOLATING TORQUE FLUCTUATIONS

(75) Inventor: John Martin Allport, Halifax (GB)

(73) Assignee: Metaldyne International (UK) Limited, (GB)

( * ) Notice: Subject to any disclaimer, the term of this patent is extended or adjusted under 35 U.S.C. 154(b) by 24 days.

(21) Appl. No.: 10/475,250

(22) PCT Filed: Apr. 8, 2002

(86) PCT No.: PCT/GB02/01637

§ 371 (c)(1),
(2), (4) Date: Mar. 8, 2004

(87) PCT Pub. No.: WO02/086342

PCT Pub. Date: Oct. 31, 2002

(65) Prior Publication Data

US 2004/0159507 A1 Aug. 19, 2004

(30) Foreign Application Priority Data

Apr. 20, 2001 (GB) ................................ 0109706.2

(51) Int. Cl.$^7$ .............................................. F16D 3/34
(52) U.S. Cl. ...................... 192/44; 192/41 R; 74/574
(58) Field of Search ........... 74/573 F–574; 464/61–96; 192/44, 45, 54.52, 209; 188/82.8, 82.84

(56) References Cited

U.S. PATENT DOCUMENTS

| | | | |
|---|---|---|---|
| 3,820,640 A | * | 6/1974 | Marola et al. ................. 192/45 |
| 5,067,598 A | * | 11/1991 | Ritter et al. .............. 192/223.2 |
| 5,205,788 A | * | 4/1993 | Sacher et al. .................. 464/61 |
| 5,941,133 A | * | 8/1999 | Wierzba et al. ........... 74/573 F |
| 5,988,015 A | * | 11/1999 | Riu .............................. 74/574 |
| 6,053,295 A | * | 4/2000 | Orlamunder et al. ...... 192/55.3 |
| 6,062,104 A | * | 5/2000 | Allport ........................ 74/574 |
| 6,092,635 A | * | 7/2000 | McCarthy et al. ............ 192/45 |
| 6,110,046 A | * | 8/2000 | Rohs et al. ................... 464/66 |
| 6,170,625 B1 | * | 1/2001 | Tanaka ........................ 192/45 |

FOREIGN PATENT DOCUMENTS

| | | |
|---|---|---|
| DE | 196 41 695 A | 4/1998 |
| EP | 0 898 665 A | 3/1999 |
| JP | 57 040142 A | 3/1982 |

* cited by examiner

Primary Examiner—Chris Schwartz
(74) Attorney, Agent, or Firm—Michael Best & Friedrich LLP

(57) ABSTRACT

The present invention relates to a device for isolating torque fluctuations of a rotary drive shaft. The device comprises a first member (2) for connection to the drive shaft, a second member (3) for connection to a driven member and an intermediate member (21) interposed between the first and second members. The intermediate member comprises a radially outer ring (22) connected to the first member, a radially inner ring (24) connected to the second member and at least one resilient rolling element (32) in a cavity between the inner and outer rings. The cavity is defined by alignment of at least one pair of recesses (26, 29), one recess being on the radially inner surface of the outer ring and the other recess being on the outer surface of the inner ring, each recess having a ramped surface. Relative rotation of the first and second members causes relative rotation of the inner and outer rings so that the rolling element rotates and compresses.

31 Claims, 1 Drawing Sheet

DEVICE FOR ISOLATING TORQUE FLUCTUATIONS

Figure 1:
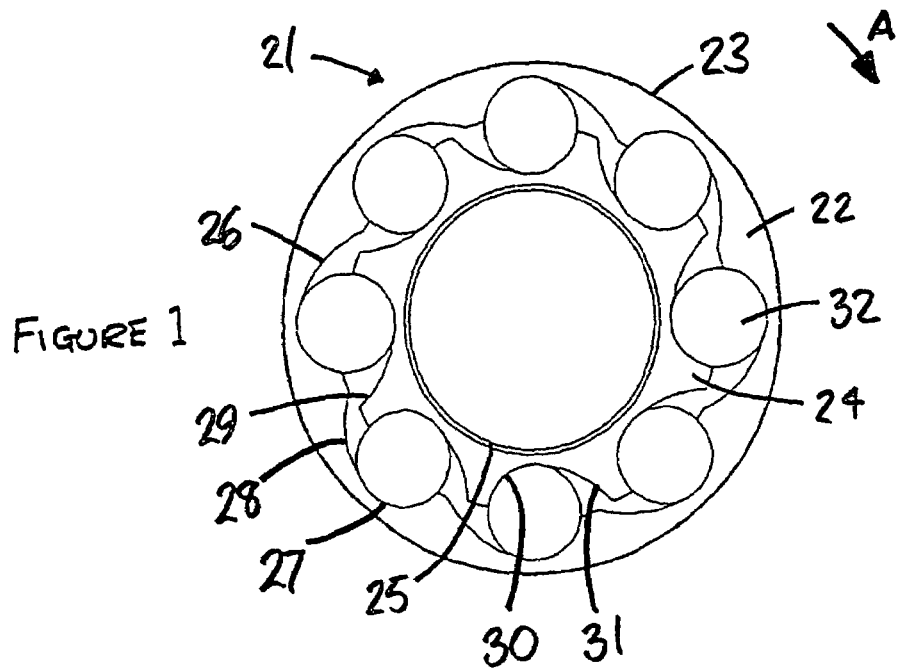

The present invention relates to a torsional isolation device for isolating fluctuations in torque and more particularly, but not exclusively, to such a device for isolating fluctuations in the drive torque of a crankshaft of an automotive internal combustion engine.

In internal combustion engines the torque applied to the crankshaft fluctuates as a result of, for example, the periodic firing of the engine pistons that drive the crankshaft and the changes in the speed of rotation of the crankshaft. These torque fluctuations may be transferred to auxiliary components that are driven from the crankshaft such as, for example, a fan, water pump, or air conditioning etc. The transmission of such fluctuations is undesirable as it may affect operation of the auxiliary components.

The imminent change of the electrical power supply in automobiles from 12V to 36V will change the way in which many components are driven and has lead to the design of combined alternator and starter motor units (starter-alternators). At engine start-up, the starter-alternator drives the crankshaft. Subsequent to start-up, the crankshaft drives the starter-alternator and auxiliary components. The starter-alternator, crankshaft and auxiliary components are linked by a common drive belt so that torque is transmitted from the crankshaft to the starter-alternator, or vice versa. In such a design it is necessary to isolate torque fluctuations in the crankshaft when the crankshaft drives the starter alternator and the auxiliary components but when the starter-alternator is driving the crankshaft the torque fluctuations are negligible.

Drive devices that isolate torque fluctuations from a crankshaft are known but are not appropriate for the starter alternator system described above. Such devices are usually mounted on the crankshaft of the internal combustion engine of a motor vehicle so that they can drive a driven auxiliary component such as a fan or other piece of equipment. Devices of this type are often fitted with a torsional vibration damper in the form of an annular inertia member mounted on an elastomeric material.

One example of a drive device of this kind is disclosed in European Patent No. EP808431. This document describes a drive device comprising a first member connected to the drive shaft and a second member having a contoured pulley rim to which a V-belt drive is attached. The belt transmits power from the drive shaft to a driven component. The first and second members are interconnected by a torsionally flexible elastic ring which is loaded in shear and effectively absorbs rotational fluctuations in the motion of the drive shaft so that they are not transmitted to the driven component. Torsional vibrations of the shaft to which the device is attached are damped by means of an inertia ring connected to the first member by means of an elastic element.

As this device provides isolation from torque fluctuations via an elastic ring that would deform equally in both directions of relative rotation of the members it is not suitable for the application described above. Moreover, a device of this type has disadvantages in that the first and second members are subject to a relatively large relative rotational displacement during initial loading before the drive torque is transmitted to the load through the torsionally flexible elastic ring. Moreover, if the torsionally flexible elastic ring should fail through age or excess loading the intermediate member provides no drive connection between the driving shaft and the driven member. A further disadvantage is that the torsionally flexible elastic ring is loaded in shear as in all devices of this kind. Elastomeric materials exhibit poor physical characteristics when loaded in shear and have a tendency to wear and/or fail.

A further example of a drive device with torque fluctuation isolation is disclosed in European Patent No. EP898665. In this case the first and second members are interconnected by a plurality of elastomeric elements which are pre-compressed in a circumferential direction between retaining plates fixed to the first and second members. Pre-compression of the elastomeric elements permits a minimum torque of the drive shaft for a nominal torque level to be transmitted to the driven member load substantially without deflection of the elastomeric element.

Besides being unsuitable for the aforementioned application for the same reasons as aforementioned, a disadvantage of the invention disclosed in EP898665 is the undesirable noise level produced during operation by the retaining plates knocking against the first and/or second members. A further disadvantage of this device is the requirement to bond the retaining plates to the elastomeric elements, which substantially increases both the complexity and cost of production.

It is an object of the present invention to obviate or mitigate the aforesaid disadvantages.

According to the present invention there is provided a torsional isolation device for isolating torque fluctuations of a rotary drive shaft, the device having an axis of rotation and comprising a first member for connection to the drive shaft, a second member for connection to a driven member, the first and second members being arranged for relative angular displacement, and a rolling element interposed in a cavity between the first and second members; the first and second members having opposed recesses that define said cavity, each recess having a ramped surface, wherein relative angular displacement of the first and second members in at least one direction causes the ramped surfaces of the opposed recesses to move over the rolling element so as to rotate it and causes them to move towards one another so as to reduce a dimension of the cavity.

The use of such recesses enables torque fluctuations to be isolated by combined rotation of the rolling element and compression of either the resilient rolling element within each cavity or compression of the parts of the first and second members that define the recesses. Driving the rolling element (or the first and second members) in compression rather than in shear, reduces the tendency for this component to wear and/or fail and permits a wider range of torque fluctuations to be isolated.

Preferably, each recess has a stop face, the stop faces of each cavity being opposite one another in a circumferential direction with the rolling element interposed. Thus when there is relative angular displacement of the first and second members in a first direction the stop faces move away from one another, the ramped surfaces of the recess pair move over the rolling element so as to rotate it and move towards one another so as to reduce the radial dimension of said cavity (thereby compressing the rolling element or the parts of the first and second members that form the cavity) and when there is relative angular displacement in the opposite direction the stop faces move towards one another and compress against the rolling element without rotating it.

The use of ramped recesses, each with a stop face, allows torque fluctuations to be isolated when the first member drives the second member and relative angular displacement of the members is in a first direction. This happens, for example, when a crankshaft (connected to the first member) is driving a starter-alternator (connected for the second member). In the event that the starter alternator drives the crankshaft the second member drives the first member and there is relative angular displacement in the opposite direction and the drive torque is transmitted between the two with only a relatively small compression of the rolling element (or first and second members).

Preferably, the stop face is arcuate and has a radius of curvature is substantially similar to a radius of curvature of the rolling element.

Each recess may be asymmetrically arcuate in cross section.

In a preferred embodiment the rolling element is resilient and is compressed when a dimension of the cavity is reduced.

The device may further comprise an intermediate member between the first and second members, the intermediate member comprising a first ring connected to the first member and a second ring connected to the second member, the cavity being defined by opposed recesses on the first and second rings.

The first ring and first member are preferably radially inboard of the second ring and second member, the radially outer surface of the first ring having at least one of said opposed recesses and the radially inner surface of the second ring having at least one of said opposed recesses.

The first and second rings may each comprise a plurality of said recesses which are preferably equi-angularly spaced. The first and second rings are preferably substantially annular.

Conveniently, an inertia member is connected to the first member via an elastomeric element. Alternatively, an inertia member may be disposed in a housing containing a viscous or elasticoviscous fluid, the housing being connected to the first member.

A radial bearing may be provided between a rim of the second member and the inertia member, and an axial bearing is preferably provided in an axial clearance between the first and second members. Preferably, a radial bearing sleeve may be provided between a hub member and an axially extending ring of the second member.

The rolling element may be in the form of a cylinder and may be formed from an elastomeric material.

Conveniently, the intermediate member may be interposed between an axially extending ring of the first member and an axially extending ring of the second member.

Figure 2:
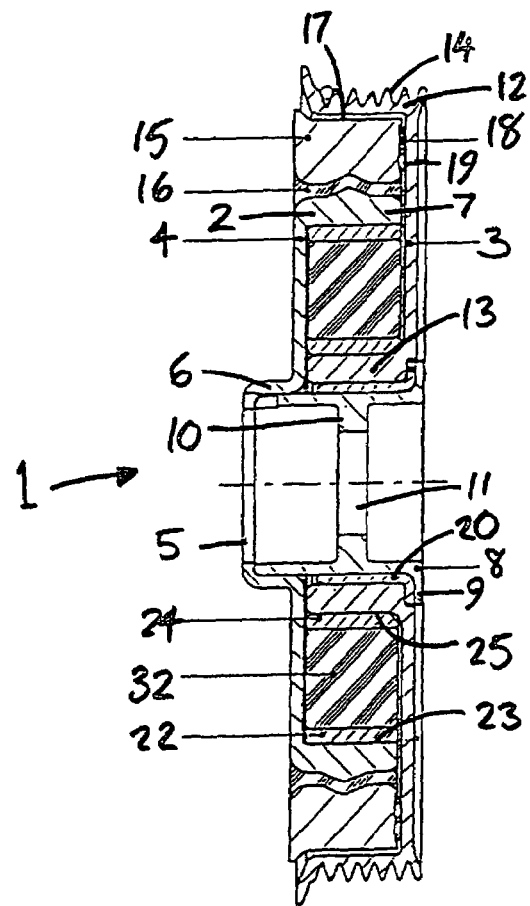

A specific embodiment of the present invention will now be described, by way of example only, with reference to the accompanying drawings in which:

FIG. 1 is a front view of intermediate member forming part of the device of the present invention; and FIG. 2 is a sectioned side view of the device of the present invention.

Referring now to FIGS. 1 and 2, the device 1 comprises concentric first and second annular members 2, 3. The first annular member 2 is designed to connect to a rotary drive shaft (not shown) for example the crankshaft of an internal combustion engine of a motor vehicle. The second annular member 3 is designed to connect to a driven component such as a fan or other piece of equipment so that the engine can drive the driven equipment.

The first annular member 2 comprises a disc 4 with a central aperture 5 for receiving the rotary shaft (not shown). The disc 4 has a central portion 6 extending substantially parallel to the rotational axis of the drive shaft and, at its radially outer periphery, a ring 7 extending in the axial direction. On its radially inner surface, the central portion 6 is fixed to one end of a hub member 8. The hub member 8 is generally cylindrical with a radially outward extending flange 9 opposite the end where it is fixed to the central portion 6. The flange 9 extends radially over part of the axially outer surface of the second annular member 3. The hub member 8 also comprises a radially inner ring 10 with a central aperture 11 to receive the drive shaft (not shown).

The second annular member 3 comprises a substantially axially extending peripheral pulley rim 12 and a concentric radially inner ring 13. The radially outer surface of the pulley rim 12 has a V-recess configuration 14 designed to receive a drive belt having a complementary V-recess configuration. The drive belt is used to drive auxiliary equipment. Alternative embodiments of the surface of the pulley rim may be provided for example chain sprockets to receive a chain drive.

The peripheral ring 7 of the first annular member 2 supports, on its radially outer surface, an annular inertia member 15 which is fixed thereto by means of an intermediate elastomeric layer 16. This arrangement is well known and acts to dampen torsional vibrations of the drive shaft. In an alternative embodiment (not shown), the elastomeric layer 16 may be replaced with a viscous or elasticoviscous fluid contained within a ring-shaped housing in which the inertial member is disposed.

The pulley rim 12 of the second annular member 3 extends over the radially outer surface of the inertia member 15 with a radial clearance 17. A low friction bearing 18, such as PTFE or nylon tape, is placed in an axial clearance 19 which is defined between the axially outer surface of the inertia member 15 and the axially inner surface of the second annular member 3 so as to act as an axial guide bearing. The physical characteristics of the inertia member 15, the elastomeric layer 16 and the low friction bearing 18 are selected according to the degree of damping required for a particular combination of drive shaft and driven member.

A cylindrical bearing sleeve 20 is disposed concentrically between the hub member 8 and the inner ring 13 of the second annular member 3.

Between the first and second annular members 2, 3 there is an intermediate member 21 that transfers drive from the first annular member 2 to the second annular member 3 or vice versa. The intermediate member 21 comprises an outer ring 22 whose radially outer surface 23 is fixed to the radially inner surface of the peripheral ring 7 of the first annular member 2, and an inner ring 24 whose radially inner surface 25 is fixed to the radially outer surface of the inner ring 13 of the second annular member 3. The method of fixing the outer and inner rings 22, 24 may be by any convenient means, for example, welding or use of a suitable adhesive.

The outer ring 22 has a plurality of axially extending parallel arcuate recesses 26 on its radially inner surface. Each recess has an identical asymmetric cross-section, a first part 27 being of constant radius and a second relatively shallow part 28. The radially outer surface of the inner ring 24 has similar recesses 29 with the opposite orientation of first and second parts 30, 31. Aligned pairs of recesses 26, 29 define a cavity in which there is disposed a rolling element 32 of substantially identical radius to that of the first parts 27, 30 of each recess. In a rest position the rolling element 32 is received within the first part 27, 30 of each of the recesses 26, 29.

The circumferential asymmetry of the recesses 26, 29 is such that, when torque is applied such that there is rotation of the inner ring 24 in the direction of arrow A, the rolling element 32 simultaneously rolls along the second part 28, 31 of each of the recesses 26, 29 and is gradually compressed up to a limit determined by the shape of the recess 26, 29 and the shape and elastic characteristics of the rolling element 32. If torque is applied in the direction of arrow A to the outer ring 22, significant angular displacement of the outer ring 22 relative to the inner ring 24 is prevented by the presence of the rolling element 32 which is compressed slightly but cannot roll. In this way, torque fluctuations can be isolated over a significant range when the inner ring 24 is rotated in the direction of arrow A (for example, when the crankshaft is driving a starter-alternator and other auxiliary components via the belt). Alternatively, when the outer ring 22 is rotated in the direction of arrow A (for example when a starter-alternator is driving the crankshaft) only a small amount of relative angular displacement of the first and second annular members is accommodated whilst the rolling element is compressed and thereafter there is a firm connection between the first and second members so that the drive torque is transmitted directly to the crankshaft.

It will be understood that numerous modifications to the above-described designs may be made without departing from the scope of the invention as defined in the claims. For example, use of an intermediate member with asymmetric arcuate recesses, as described above, produces a device with torque isolation characteristics in mainly one direction of angular displacement rotation of the annular members. If isolation in both directions is required the shape of the recess or the resilient characteristics of the rolling element are changed. Thus the device can be designed to isolate torque fluctuations over a greater range in one direction of relative angular displacement of the annular members than in the opposite direction. Alternatively, if conventional isolation characteristics are desired whereby isolation is performed to equal effect in both directions, the outer and inner rings of the intermediate member with symmetrically arcuate recesses can be used with no further changes to the other components of the device required.

Whatever form of isolation characteristics are required, the shape of the recesses on the inner and outer rings of the intermediate member should be such that the rolling elements can rotate sufficiently to enable torque fluctuations to be isolated so that they are not passed on to a pulley and the driven components. Consequentially, the recesses need not be arcuate in cross-section; the arcuate edge of each recess could be replaced with a linearly inclined edge. Additionally, the choice of material from which the rolling element is manufactured should be such that the rolling element can be compressed in a generally radial direction enabling a range of torque fluctuations to be isolated. It will be understood that in a modified design the inner and outer rings may be omitted and the recesses defined on the radially inner and outer surfaces of the annular members.

The first annular member may be fitted to the rotary drive shaft by any suitable means such as a key, spline or shrink connection. The presence of the inertia member is optional and the low friction bearings may be manufactured from any suitable material.

Furthermore, the outer and inner rings of the intermediate member and the rolling elements may be manufactured from any material with physical characteristics appropriate to the task to which the device is to be applied. It is to be appreciated that the resilient characteristics of the rolling elements could be replaced with inner and outer rings that are manufactured from a material with resilient characteristics. For example, if the outer and inner rings of the intermediate member were manufactured from steel, a suitable material for the rolling elements would be rubber. Alternatively, if the outer and inner rings of the intermediate member were manufactured from rubber, a suitable material for the rolling elements would be steel.

What is claimed is:

1. A torsional isolation device for isolating torque fluctuations of a rotary drive shaft, the device having an axis of rotation and comprising a first member for connection to the drive shaft, a second member for connection to a driven member, the first and second members being arranged for relative angular displacement, and a rolling element interposed in a cavity between the first and second members; the first and second members having opposed recesses that define said cavity, each recess having a ramped surface comprising a first portion and a second portion that defines a stop face, the stop faces of each recess being at opposed ends of the cavity, the rolling element being in contact with each ramped surface so as to enable the transmission of torque from one member to the other, wherein relative angular displacement of the first and second members in a first direction causes the ramped surfaces of the opposed recesses to move in opposite directions so as to rotate the rolling element such that the stop faces move away from one another and the first portions move towards one another so as to reduce a dimension of the cavity, and wherein when there is relative angular displacement in a second opposite direction the stop faces move towards one another and compress the rolling element, the contact between the rolling element and the ramped surfaces thus being continuous regardless of the relative angular disposition of the members.

2. A drive assembly comprising a rotary drive shaft connected to a driven member via the torsional isolation device according to claim 1.

3. A drive assembly according to claim 2, wherein the rotary drive shaft is a crankshaft of an internal combustion engine.

4. A drive assembly according to claim 3, wherein the driven member is connected to the torsional isolation device by a drive belt.

5. A drive assembly according to claim 4, wherein the second member of the torsional isolation device has a rim configured to receive a drive belt.

6. A drive assembly according to claim 2, wherein the driven member is connected to the torsional isolation device by a drive belt.

7. A drive assembly according to claim 6, wherein the second member of the torsional isolation device has a rim configured to receive a drive belt.

8. A torsional isolation device according to claim 1, wherein an inertia member is connected to the first member via an elastomeric element.

9. A torsional isolation device according to claim 8, wherein a radial bearing is provided between a rim of the second member and the inertia member.

10. A torsional isolation device according to claim 1, wherein there is a plurality of said cavities each defined by said opposed recesses.

11. A torsional isolation device according to claim 10, wherein the cavities are equiangularly spaced.

12. A torsional isolation device according to claim 1, wherein the stop face is arcuate and has a radius of curvature is substantially similar to a radius of curvature of the rolling element.

13. A torsional isolation device according to claim 1, wherein the rolling element is resilient and is compressed when a dimension of the cavity is reduced.

14. A torsional isolation device according to claim 1, wherein each recess is asymmetrically arcuate in cross section.

15. A torsional isolation device according to claim 1, wherein a radial bearing sleeve is provided between a hub member and an axially extending ring of the second member.

16. A torsional isolation device according to claim 1, wherein the rolling element is in the form of a cylinder.

17. A torsional isolation device according to claim 1, wherein the rolling element is formed from an elastomeric material.

18. A torsional isolation device according to claim 1, wherein there is provided an axial bearing in an axial clearance between the first and second members.

19. A torsional isolation device for isolating torque fluctuations of a rotary drive shaft, the device having an axis of rotation and comprising:
   a first member for connection to the drive shaft;
   a second member for connection to a driven member, the first and second members being arranged for relative angular displacement; and
   an intermediate member interposed between the first and second members, the intermediate member including a first ring connected to the first member, a second ring connected to the second member, a cavity defined by opposed recesses on the first and second rings, wherein each recess has a ramped surface, and a rolling element interposed in the cavity between the first and second rings and being in contact with each ramped surface so as to enable the transmission of torque from one member to the other,
   wherein relative angular displacement of the first and second rings in a first direction causes the ramped surfaces of the opposed recesses to move in opposite directions so as to rotate the rolling element and reduce a dimension of the cavity, and wherein relative angular displacement of the first and second rings in a second opposite direction moves the opposed recesses towards each other and compresses the rolling element, the contact between the rolling element and the ramped surfaces thus being continuous regardless of the relative angular disposition of the members.

20. A torsional isolation device according to claim 19, wherein the first ring and first member are radially inboard of the second ring and second member, the radially outer surface of the first ring defining one of said opposed recesses and the radially inner surface of the second ring defining one of said opposed recesses.

21. A torsional isolation device according to claim 20, wherein the first and second rings are substantially annular.

22. A torsional isolation device according to claim 21, wherein the intermediate member is interposed between an axially extending ring of the first member and an axially extending ring of the second member.

23. A torsional isolation device according to claim 20, wherein the intermediate member is interposed between an axially extending ring of the first member and an axially extending ring of the second member.

24. A torsional isolation device according to claim 19, wherein the ramped surface of each recess includes a first portion and second portion that defines a stop face, the stop faces of each recess being opposite one another in a circumferential direction with the rolling element interposed.

25. A torsional isolation device according to claim 24, wherein when there is relative angular displacement of the first and second rings in the first direction the stop faces move away from one another, and when there is relative angular displacement in the second opposite direction the stop faces move towards one another.

26. A torsional isolation device according to claim 24, wherein the stop face is arcuate and has a radius of curvature substantially similar to a radius of curvature of the rolling element.

27. A torsional isolation device according to claim 19, wherein the first and second rings are substantially annular.

28. A torsional isolation device according to claim 27, wherein the intermediate member is interposed between an axially extending ring of the first member and an axially extending ring of the second member.

29. A torsional isolation device according to claim 19, wherein the intermediate member is interposed between an axially extending ring of the first member and an axially extending ring of the second member.

30. A torsional isolation device according to claim 19, wherein the rolling element is resilient and is compressed when a dimension of the cavity is reduced.

31. A torsional isolation device according to claim 19, wherein each recess is asymmetrically arcuate in cross section.

* * * * *